(12) United States Patent
Sebring

(10) Patent No.: US 6,206,621 B1
(45) Date of Patent: Mar. 27, 2001

(54) APPARATUS FOR CHIP REMOVAL

(75) Inventor: Gerald J. Sebring, Victor, NY (US)

(73) Assignee: The Gleason Works, Rochester, NY (US)

( * ) Notice: Subject to any disclaimer, the term of this patent is extended or adjusted under 35 U.S.C. 154(b) by 0 days.

(21) Appl. No.: 09/389,155

(22) Filed: Sep. 2, 1999

Related U.S. Application Data

(60) Provisional application No. 60/099,590, filed on Sep. 9, 1998.

(51) Int. Cl.[7] .................................................... B23Q 11/00
(52) U.S. Cl. ................................ 409/137; 408/67; 409/10
(58) Field of Search ............................... 408/67; 409/10, 409/11, 38, 137

(56) References Cited

U.S. PATENT DOCUMENTS

| | | |
|---|---|---|
| 3,882,598 | 5/1975 | Earle et al. . |
| 4,063,478 | 12/1977 | Stuy . |
| 4,367,665 | 1/1983 | Terpstra et al. . |
| 4,530,626 * | 7/1985 | Sabbioni ............................ 409/10 |
| 4,655,005 | 4/1987 | Roberts . |
| 5,228,814 | 7/1993 | Suwijn . |
| 5,582,225 | 10/1996 | Schank . |
| 5,586,848 | 12/1996 | Suwijn . |
| 5,594,972 | 1/1997 | Iversen . |
| 5,813,806 * | 9/1998 | Muller ............................... 409/137 |
| 5,947,663 * | 9/1999 | Egawa et al. ..................... 409/137 |
| 5,961,260 * | 10/1999 | Kasler et al. ..................... 409/137 |
| 6,056,487 * | 5/2000 | Brehmer et al. .................. 409/137 |

FOREIGN PATENT DOCUMENTS

| | | |
|---|---|---|
| 4002568 | 8/1991 | (DE) . |
| 9108031 | 9/1991 | (DE) . |
| 29520934 | 6/1996 | (DE) . |
| 19734628 | 2/1999 | (DE) . |
| 289051 * | 10/1992 | (JP) ...................................... 409/137 |

OTHER PUBLICATIONS

Ophey, Lothar, "Gear Hobbing Without Coolant", *Gear Technology*, Nov./Dec. 1994, pp. 20–24.

Phillips, Robert, "New Innovations in Hobbing—Part II", *Gear Technology*, Nov./Dec. 1994, pp. 26–30.

Stadtfeld, Hermann J. "Gleason POWER–DRY–CUTTING™ of Bevel and Hypoid Gears", The Gleason Works, Rochester, New York, May 1997.

\* cited by examiner

*Primary Examiner*—Daniel W. Howell
(74) *Attorney, Agent, or Firm*—Robert L. McDowell

(57) ABSTRACT

Apparatus for removing chips from the machining chamber of a machine tool comprising primary and secondary chip removal ports with the primary chip port being positioned in the stream of chips emanating from the workpiece being cut and the secondary chip port being located in a trough at or near the bottom of the machining chamber for collecting chips not entering the primary chip port. A source of vacuum is applied to both ports either simultaneously or, preferably, in an alternating manner and chips are conveyed through respective conduits to a chip collection container.

13 Claims, 4 Drawing Sheets

APPARATUS FOR CHIP REMOVAL

This application claims benefit of provisional application No. 60/099590, filed Sep. 9, 1998.

FIELD OF THE INVENTION

The present invention relates to machine tools and the manner in which metal chips from machining processes are removed therefrom. Specifically, the present invention is directed to machines for producing spur and helical gears and an apparatus therein for directing chips away from the machining area.

BACKGROUND OF THE INVENTION

Traditionally, machining of metal workpieces to produce desired articles, such as hobbing processes to produce spur and helical gears, shafts, splines, and the like has been performed in the presence of a coolant medium supplied to the point of engagement of a tool and workpiece. Aside from the obvious function of cooling the tool and workpiece, coolant also reduces tool wear and serves to flush metal chips, which emanate from a machined workpiece, away from the area of engagement of tool and workpiece and out of the machine. Once flushed away from the tool and workpiece, chips may be separated from the coolant by filtering or by magnetic separator means as is well known in the art.

While coolant certainly has many advantages, it also has its drawbacks. Coolant is expensive to purchase, and in some cases disposal costs are just as expensive. Coolant mist and coolant oil smoke are considered to be environmental hazards. Therefore, machines must include a mist/smoke collector as a means to remove such airborne contaminants from the atmosphere within the machine enclosure. Coolant circulation in a machine tool requires a pump and hoses to deliver coolant to the machining area, and a chip separator to remove metal chips from the coolant. Such separators are somewhat more complicated than simple powered drag lines used to convey dry chips. In some cases, filters may be needed to remove other debris from the coolant, or a coolant chiller may be required to control both the coolant and the machine equilibrium temperature.

Recently, dry machining processes such as dry hobbing of cylindrical gears and dry cutting of bevel gears have drawn attention as an alternative to processes utilizing coolant (wet machining processes). See, for example, Phillips, "New Innovations in Hobbing—Part II", *Gear Technology*, November/December 1994, pp. 26–30, and, Stadtfeld, "Gleason POWER-DRY-CUTTING™ of Bevel and Hypoid Gears", The Gleason Works, Rochester, N.Y., May 1997.

It may be seen that dry machining has the potential to overcome many serious and costly drawbacks associated with the use of a liquid coolant. Also, dry chips are normally more valuable as a recyclable material than chips which are residually wetted by a process fluid. Parts cut without coolant do not need washing, prior to further processing such as heat treatment However, the heat generated in dry machining processes is a contributor to tool wear and it also may have detrimental effects on the machine itself, causing differential growth of components such as spindles, bearings, or the machine frame. Much of the process heat in dry machining is removed by the chips that must be removed from the machine as quickly as possible and in a manner by which they do not contact the machine frame for any extended period of time.

One way to remove dry chips is to permit the hot chips to slide by gravity toward a chip conveyor built into the base of a hobbing machine. Such a chip removal system is shown in Ophey, "Gear Hobbing Without Coolant", *Gear Technology*, November/December 1994, pp. 20–24.

Another method of removing chips from a hobbing machine capable of wet and dry hobbing is known from U.S. Pat. No. 5,586,848 to Suwijn wherein the chips are discharged into the machine base where a reversible transfer mechanism carries them to respective wet or dry outlets.

SUMMARY OF THE INVENTION

The present invention is directed to an apparatus to remove chips from the machining chamber of a machine tool. The apparatus comprises primary and secondary chip removal ports with the primary chip port being positioned in the stream of chips emanating from the workpiece being cut and the secondary chip port being located in a trough at the bottom of the machining chamber for collecting chips not entering the primary chip port. A source of vacuum is applied to both ports either simultaneously or, preferably, in an alternating manner and chips are conveyed through respective conduits to a chip collection container.

DETAILED DESCRIPTION OF THE PREFERRED EMBODIMENT

The details of the present invention will now be discussed with reference to the accompanying drawings.

Figure 1:
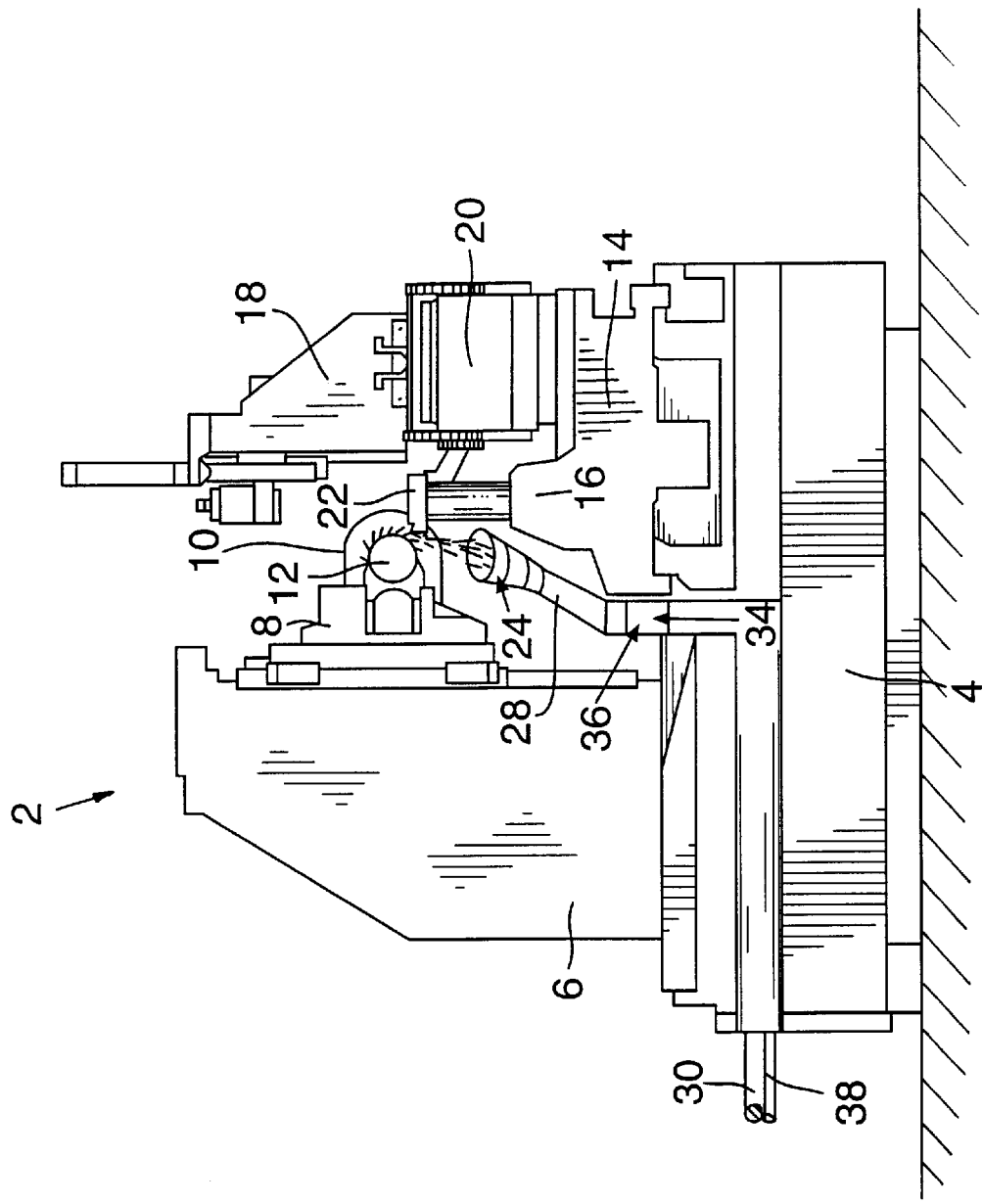
FIG. 1 is a schematic side view of a hobbing machine having a chip removal apparatus according to the present invention.

The present invention is applicable to any machine tool where chips are directed to an outlet in the machine base for their subsequent removal from the machine tool. One such machine is shown in U.S. Pat. No. 5,228,814 to Suwijn which is a hobbing machine for producing spur and helical gears. A machine of this type is illustrated in FIG. 1.

The hobbing machine 2 comprises a base 4, tool column 6, tool head 8, tool support 10 and hobbing tool 12. The machine 2 further comprises work column 14 having a headstock 16 and tailstock 18. A loading/unloading mechanism 20 is included for delivering and removing workpieces 22 for machining. Further details of the hobbing machine operation are not believed necessary for a complete understanding of the present invention. However, such details can be obtained by referring to the above patent.

In dry hobbing, hot chips emanate from the tool/workpiece are usually directed via a trough to an outlet in the machine base by gravity and with the aid of sloped surfaces on components in the machining chamber. In some instances, covering of surfaces with smooth materials such as stainless steel or aluminum is included to assist in chip flow toward the outlet. It is also known to urge chips toward an outlet by the use of air jets directed toward the outlet.

Figure 2:
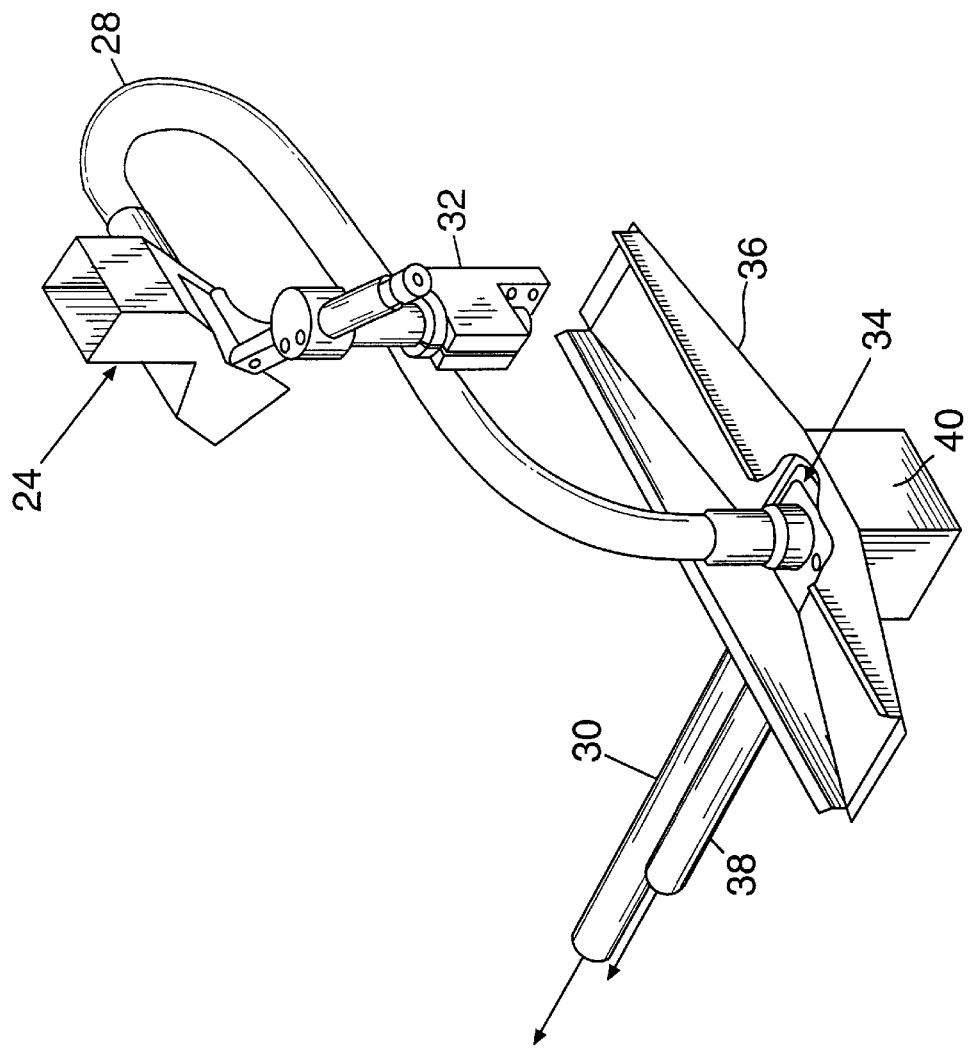
FIG. 2 is an view of the chip removal apparatus of the present invention.
Figure 3:
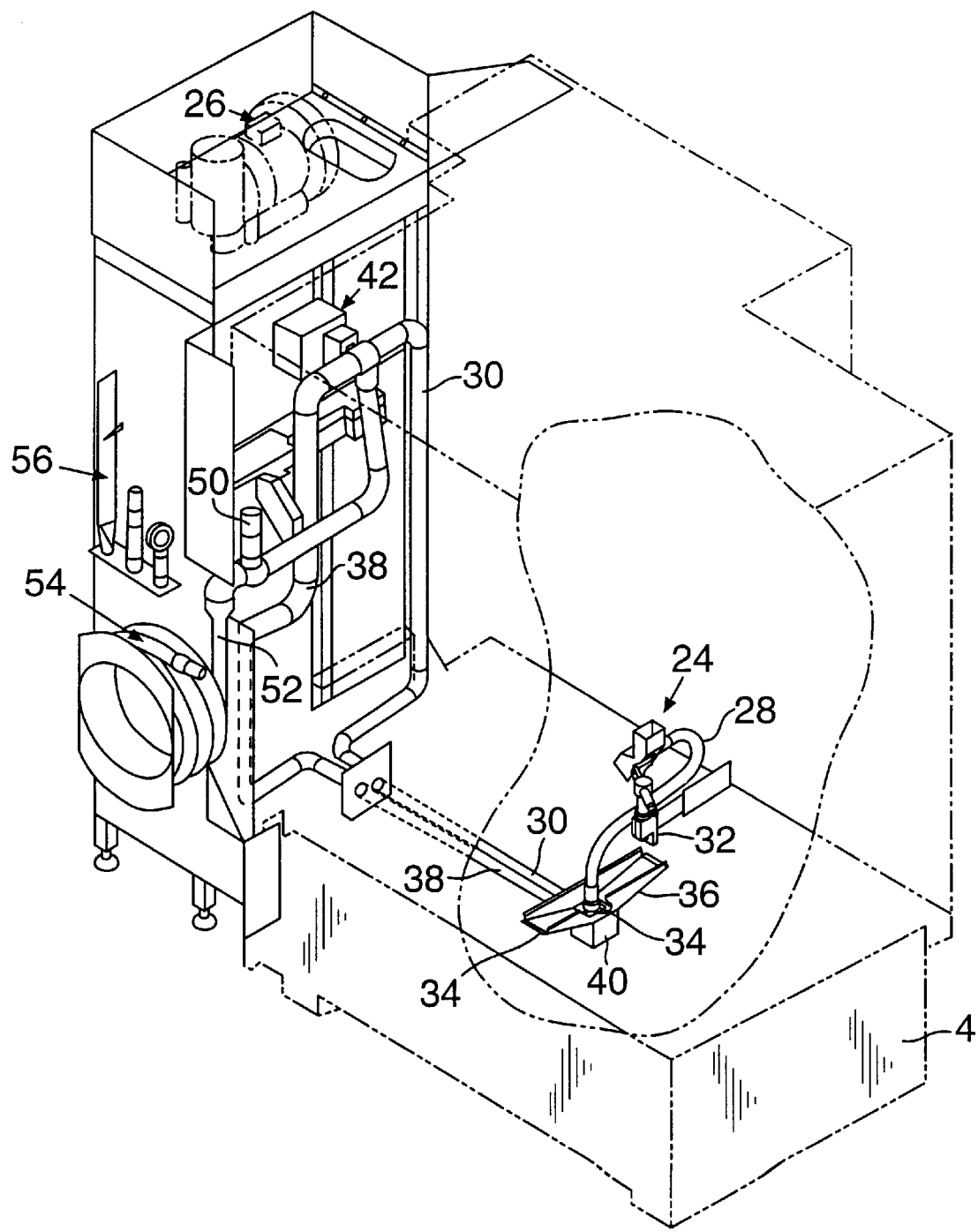
FIG. 3 is an isometric view of the inventive chip removal apparatus including the vacuum system
Figure 4:
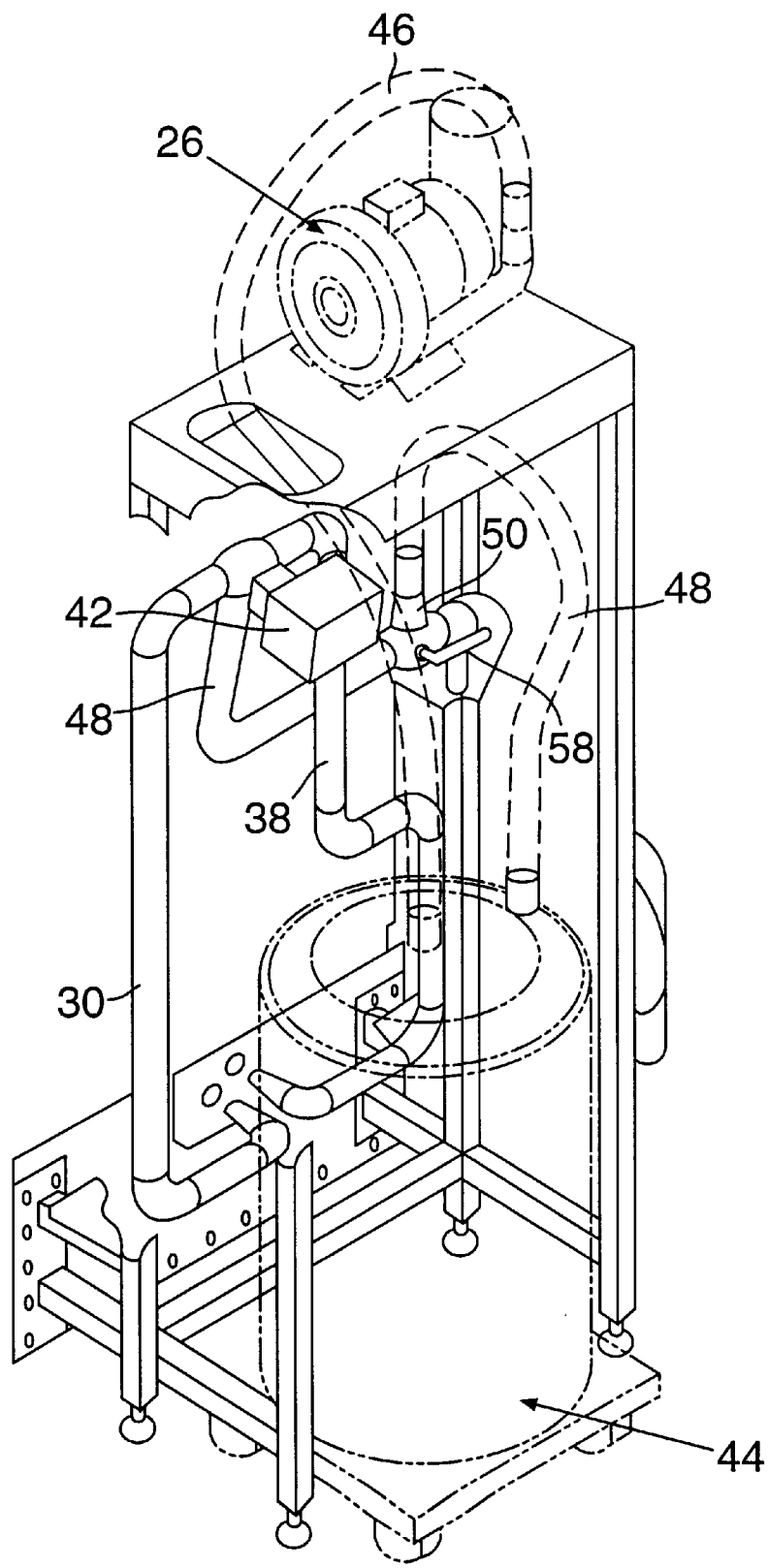
FIG. 4 is a view of the vacuum system of the present invention.

The inventor has found that an improved manner for removing chips from a machine chamber is to capture chips before they come into contact with any component surfaces of the machine. This is accomplished with the apparatus best shown in FIGS. 1 and 2 wherein a primary chip port 24 is shown in position to intercept chips as they emanate from a workpiece 22 being machined by a tool 12. Primary chip port 24 is connected to a source of vacuum 26 (FIGS. 3 and 4) via conduits 28 and 30 which are connected at the outlet in the machine base. Chip port 24 is positionable both angularly and vertically by an adjustable mounting means 32 that is secured to the machine tool at an appropriate location. In light of the adjustability of chip port 24, conduit 28 is preferably of the flexible type.

For those chips not captured by primary chip port 24, secondary chip port 34 is positioned in a chip collection trough outlet 36 in the machine frame. Specifically, secondary chip port 34 is the form of a slot located in the chip collection trough 36. The slot surrounds the conduit 28 leading from the primary chip port 24. Secondary chip port 34 is also connected to a source of vacuum 26 via conduit 38 and chamber 40.

As stated above, vacuum source 26, such as a centrifugal vacuum generator, provides vacuum to draw chips through conduits 28, 30 and 38. Vacuum can be applied to all conduits during machining, or preferably, a diverting valve 42 (FIG. 3), pneumatically operated, for example, and controlled either by the machine operator or the machine controller, may be included to cycle the application of vacuum between primary chip port 24 and secondary chip port 34. Vacuum generator 26 is connected to chip collection container 44 via conduit 46. In turn, chip collection container 46 is connected via conduit 48 to the diverting valve 42.

If desired, a T-joint 50 may be included in the conduit 48 to provide an additional conduit 52 to which is attached a flexible hose 54 for use in periodic manual clean-up of chips from hard-to-reach areas of the machine chamber. Attachments 56 for hose 54 may also be included. A manually operated valve 58 may be utilized to control the application to vacuum to hose 54.

In operation, during cutting of a workpiece, the diverting valve 42 is set to apply vacuum to the primary chip port 24 since the majority of chips will be captured by chip port 24. Periodically, either during cutting or between parts being cut, vacuum is diverted by valve 42 to secondary chip port 34 to remove chips falling into trough 36. Chips are carried through their respective conduits to chip container 44.

With the present invention, the majority of chips are removed from the machining chamber without ever coming into contact with the surface of components in the machining chamber. Thus, no heat is transferred to the machine components.

While the invention has been described with reference to preferred embodiments it is to be understood that the invention is not limited to the particulars thereof. The present invention is intended to include modifications which would be apparent to those skilled in the art to which the subject matter pertains without deviating from the spirit and scope of the appended claims.

What is claimed is:

1. An apparatus for removing chips from the machining chamber of a machine tool for producing toothed workpieces, said apparatus comprising:

a primary chip removal port being positionable to intercept a stream of chips emanating from a workpiece being machined, a secondary chip removal port being located at or near the bottom of the machining chamber for collecting chips not entering said primary chip removal port, a source of vacuum applied to said primary and said secondary chip removal ports either simultaneously or in an alternating manner, and, said chips being conveyed away from said machining chamber via respective conduits connected to said primary and secondary chip removal ports.

2. The apparatus of claim 1 wherein said secondary chip removal port is positioned in a chip collection trough.

3. The apparatus of claim 1 wherein said secondary chip removal port is located at the bottom of the machining chamber.

4. The apparatus of claim 2 wherein said secondary chip removal port and said chip collection trough are located at the bottom of the machining chamber.

5. The apparatus of claim 1 wherein said vacuum is continuously applicable to said primary chip removal port and said secondary chip removal port.

6. The apparatus of claim 1 wherein vacuum is applicable in an alternating manner to said primary chip removal port and said secondary chip removal port.

7. The apparatus of claim 6 wherein the alternating vacuum is effected by a pneumatically operated diverting valve connected to said respective conduits.

8. The apparatus of claim 6 wherein the alternating vacuum is controllable by a machine operator or by a machine computer controller.

9. The apparatus of claim 6 wherein vacuum is applicable to said primary chip removal port during machining of a workpiece and wherein vacuum is applied to said secondary chip removal port during intervals between machining of workpieces.

10. The apparatus of claim 1 wherein said vacuum is effected by a centrifugal vacuum generator.

11. The apparatus of claim 6 wherein vacuum is applicable alternatively between said primary chip removal port and said secondary chip removal port during machining.

12. The apparatus of claim 1 further including a third chip removal port in the form of a flexible hose connected to said source of vacuum and being manually operable and positionable to remove chips from within said machine chamber.

13. The apparatus of claim 6 wherein the alternating vacuum is effected by a diverting valve connected to said respective conduits and said source of vacuum.

* * * * *